G. C. RAHN.
BEEHIVE.
APPLICATION FILED JAN. 23, 1913.

1,116,919.

Patented Nov. 10, 1914.
7 SHEETS—SHEET 1.

ATTESTS:

INVENTOR
George C. Rahn
BY Fisher & Moser
ATTY'S.

G. C. RAHN.
BEEHIVE.
APPLICATION FILED JAN. 23, 1913.

1,116,919.

Patented Nov. 10, 1914.

ATTESTS:
F. C. Mussun
E. Johnson

INVENTOR
George C. Rahn
BY Fisher & Moser
ATTY'S.

G. C. RAHN.
BEEHIVE.
APPLICATION FILED JAN. 23, 1913.

1,116,919.

Patented Nov. 10, 1914.

ATTESTS:
J. C. Mussum.

INVENTOR
George C. Rahn
BY Fisher & Moser
ATTY'S

UNITED STATES PATENT OFFICE.

GEORGE C. RAHN, OF HAILEYBURY, ONTARIO, CANADA, ASSIGNOR OF ONE-HALF TO MARTIN J. O'DONNELL, OF CLEVELAND, OHIO.

BEEHIVE.

1,116,919.  Specification of Letters Patent.  Patented Nov. 10, 1914.

Application filed January 23, 1913. Serial No. 743,733.

*To all whom it may concern:*

Be it known that I, GEORGE C. RAHN, citizen of the United States, residing at Haileybury, district of Nippising, Ontario, Canada, have invented certain new and useful Improvements in Beehives, of which the following is a specification.

The invention comprises a bee-hive involving the construction and arrangement of parts substantially as herein shown, described and claimed, whereby a colony or swarm of bees may be protected, bred and developed, and also aided in material ways in all the stages of its existence so that a much greater supply of honey may be obtained from each colony and at less labor and cost than has heretofore been the case.

In the accompanying drawings, Figures 1 to 8 inclusive, show side elevations on a reduced scale of the bee-hive, each view showing a different arrangement of parts to meet a particular condition or need. Thus, Fig. 10 is a vertical section of the same organization on line 10—10, Fig. 9, whereas

In the culture of bees for honey-making in hives the requirements call for a sectional structure. Under some conditions all the sections of the hive are used, whereas under other conditions only a part thereof are in use. The sections therefore are made of a standard form and size and interchangeable. The present invention is particularly designed to meet all the foregoing requirements, so that any one of my improved sections may fit and be combined with any one or all of the other improved sections or with any standard section now in common use.

The main sections in my improved beehive are the bottom-board A, the brood-box B, the super or surplus-box C, the bee-escape board D, and the cover E. In addition I provide a cap F for the cover and an entrance-box G, as well as other new and useful devices adapted to coöperate with these parts in obtaining my general object.

The entrance-box G is substantially the same as described and shown in my Letters-Patent of the United States bearing Number 1,017,233 and dated February 13, 1912, but this box G has been also improved in certain particulars as will hereinafter appear.

*The bottom board.*—Now, beginning with the bottom board A, it is an invertible member having a raised border-frame 2 top and bottom as usual, but differing from the ordinary base in that the inner faces 3 of the border-frame are beveled as shown and in that this beveled face terminates in a straight shoulder 4 a few inches back from the front end of the straight extension 5 of said border-frame. The bevel provides extra stock so that the hand-hold recesses 6 can be made deep enough to afford a good grip without weakening the frame 2, and this extra stock also yields the shoulder 5 to afford a stop for a wooden strip which is generally used to reduce the entrance opening for the ordinary hive. Heretofore, the strip was easily displaced as no stop shoulder was used. The strip is not shown herein as it is not needed when an entrance box is used. It will be understood that the front portion of bottom-board A is level and open its full width for the passage of the bees, except when the entrance-box G is in place for the purposes hereinafter described. A flaring opening 7 in bottom-board A and a light counterweighted trap-door 8 beneath the same performs a useful function in aiding the bees to get rid of larvæ and other matter, this trap opening being preferably located midway of the sides of the board and inside of the guard-plate 9 in the entrance box G, see Fig. 9.

*The brood-box.*—This section comprises a rectangular frame B which is open top and bottom and of a size to fit and seat upon the border-frame 2 of the bottom-board A, the inner wall of the box coming even with the top edge of the beveled faces 3. The upper inner edge of each end of the box is rabbeted or grooved to seat the ordinary wire-strung frame 10 for the honey-comb cells which the bees prepare and use for the storage of honey and in hatching their larvæ. A series of these frames 10 fill the brood-chamber B but are spaced apart for ventilation and to give room for the bees to work. The brood-box B is preferably lined upon its outside with thin sheets 11 of insulating material, such as asbestos and hair and a nailed batten or border-piece 12 of wood is rabbeted in two places to engage and overlap the top edge of the box and the edges of the sheets at the sides of the box. Handle strips 14 are also secured to the outer walls of the box as usual, but these are preferably extended or built outward by fastening small cleats 15 thereto to provide rests for a removable winter-case hereinafter described.

Figure 9:
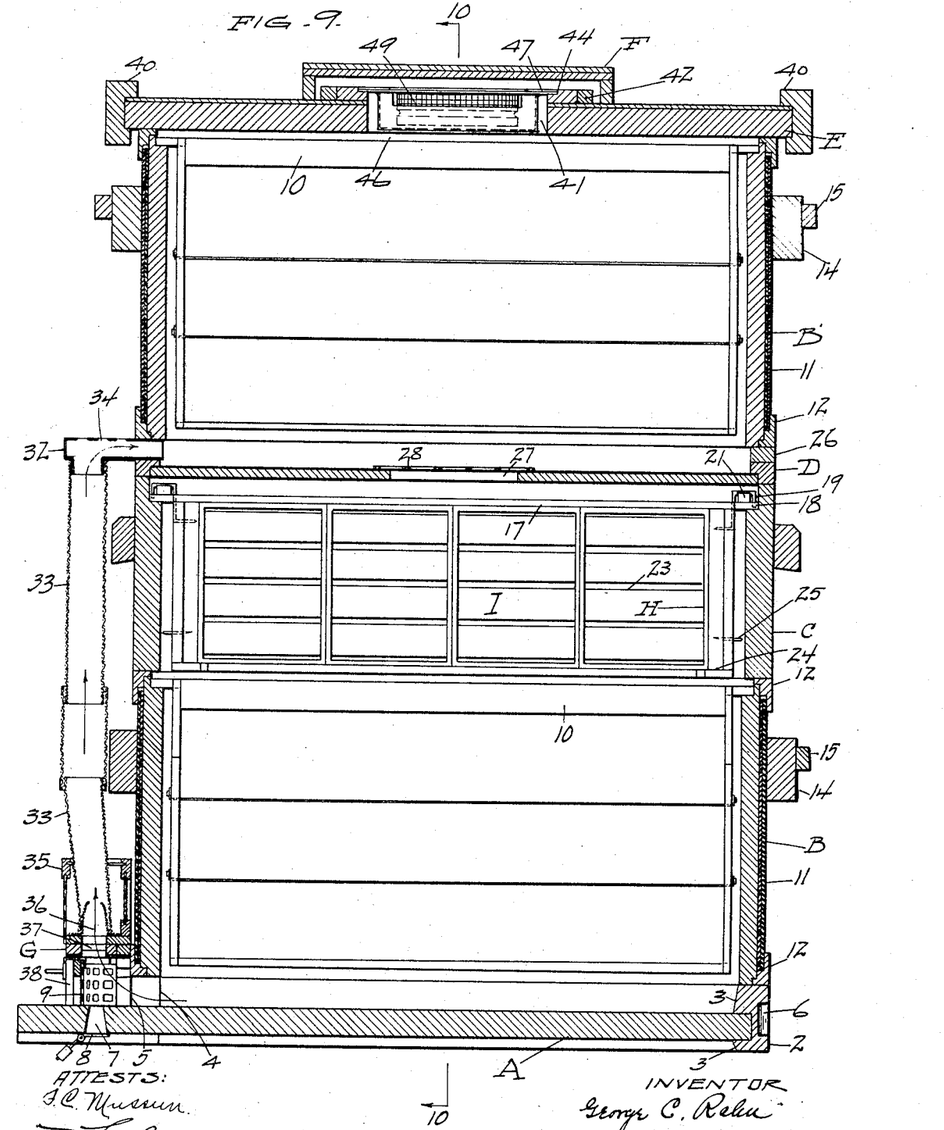
Fig. 9 is a sectional view vertically through the bee-hive from front to rear, the assembled elements being the same as in Fig. 6.
Figure 10:
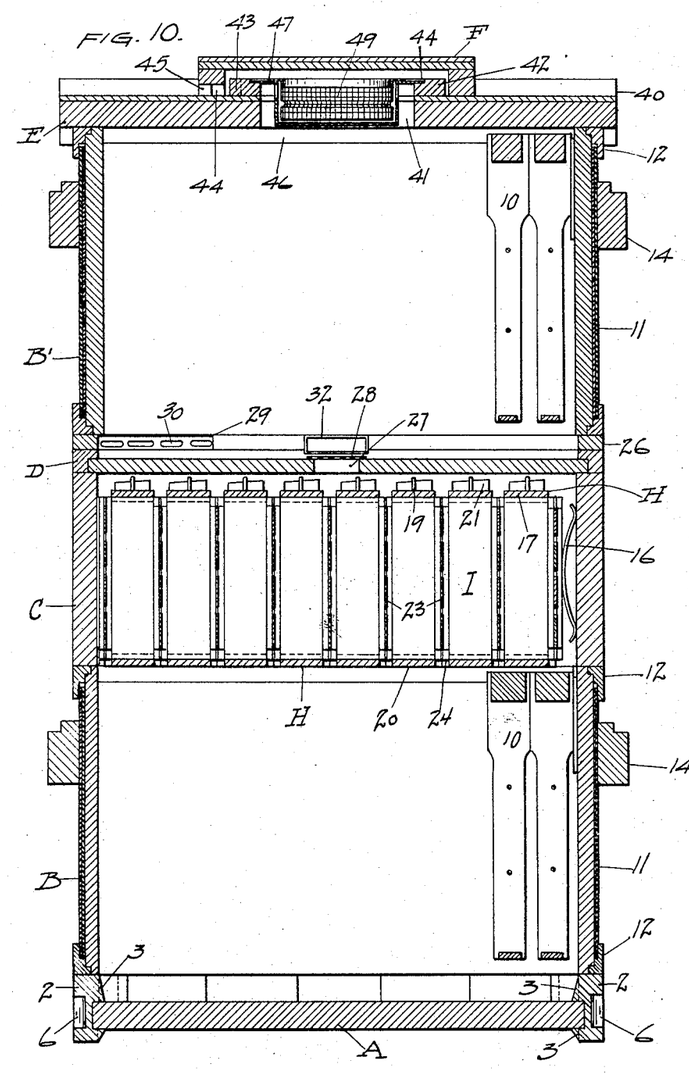

*The super or surplus-box.*—In Figs. 9 and 10, the brood-box B is shown as having a super or surplus-box C mounted thereon, this section being of the usual construction. That is, it is open top and bottom, and has a grooved top edge to seat super-frames H which hold the boxes —I— containing the marketable honey. The surplus-box C may be constructed and insulated the same as the brood-box B, particularly when protection is required against excessive heat in countries where the wax combs are apt to melt and be affected by the heat.

*The super-frames.*—Following the usual practice these frames H are banked together and held in place by bow-springs 16, see Fig. 10, and any of the known super-frame constructions may be used, but I prefer to employ the construction shown in my divisional application, Ser. No. 780,378. Briefly, the frames H comprise a removable top bar 17 having slotted ends 18 adapted to slip over hooks 19 rigidly secured to the upright ends of the three-sided body 20 of the frame. Small wedges 21 are used to clamp the top-bar in place, and therethrough one or more honey-boxes —I— also. Removable fences 23 separate the frames H and the honey-boxes I. The ledges 24 at the bottom of each super-frame end support the fences, and the projecting pins 25 at the outer ends of the frame guide and center the frame in the super-box C, see Fig. 9.

*The bee-escape board.*—The dividing section D which is mounted upon the surplus-box C, Figs. 9 and 10, comprises a board having a raised border-frame 26 of substantially the same width as the walls of the other sections. An opening 27 is provided centrally of this board, which is covered by a thin perforated metal plate 28, the perforations being merely large enough for the passage of the workers of the colony and too small for the larger queen and drones. A passage 29 is also provided through the border-frame 26 at the front for the workers, this passage communicating with the outside and having a perforated guard-plate 30 designed to bar the passage of the queen and the drones. A recess 31 is further provided in border-frame 26 at a central point at the front of board D.

Figure 11:
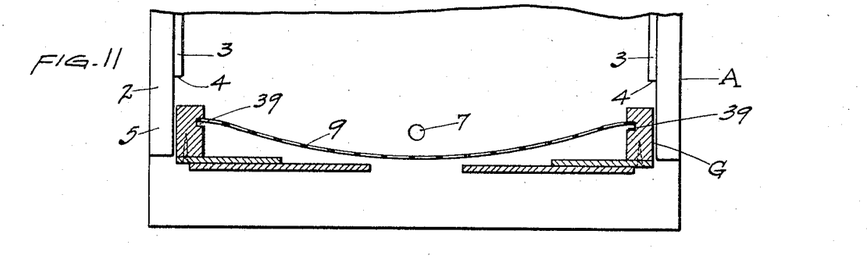
Fig. 11 is a plan section on line 11—11, of Fig. 12.
Figure 22:
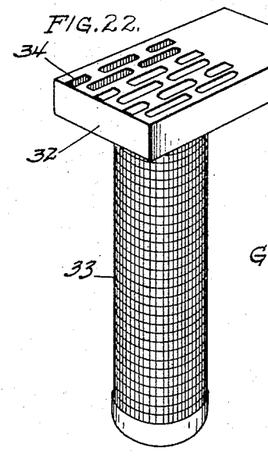
Fig. 22 is a perspective view of the swarming tube.

*The swarming and drone-catching tube.*— Recess 31 in board D affords a seat for the tubular elbow 32 which forms part of the wire-mesh tube 33, Figs. 22 and 9. The outlet end of the elbow 32 opens into the inner space of the bee-escape board when the parts are assembled as in Fig. 9, and a series of perforations 34 of a predetermined size in the top of the elbow permit only the workers to escape when trapped. Without such means of escape, the workers might block up this passage. Tube 33 may be made of wire-cloth, coiled wire, glass, celluloid, or any material adapted or made to let in light, and the escape-openings 34 for the workers may be at other points in the tube than as shown. The tube may be a single piece of any suitable length to reach the entrance box G, but as shown it is in several sections telescopically united, whereby it may be shortened or extended to connect separate brood-chambers superimposed in other relations than as disclosed in Figs. 9 to 11.

Figure 12:
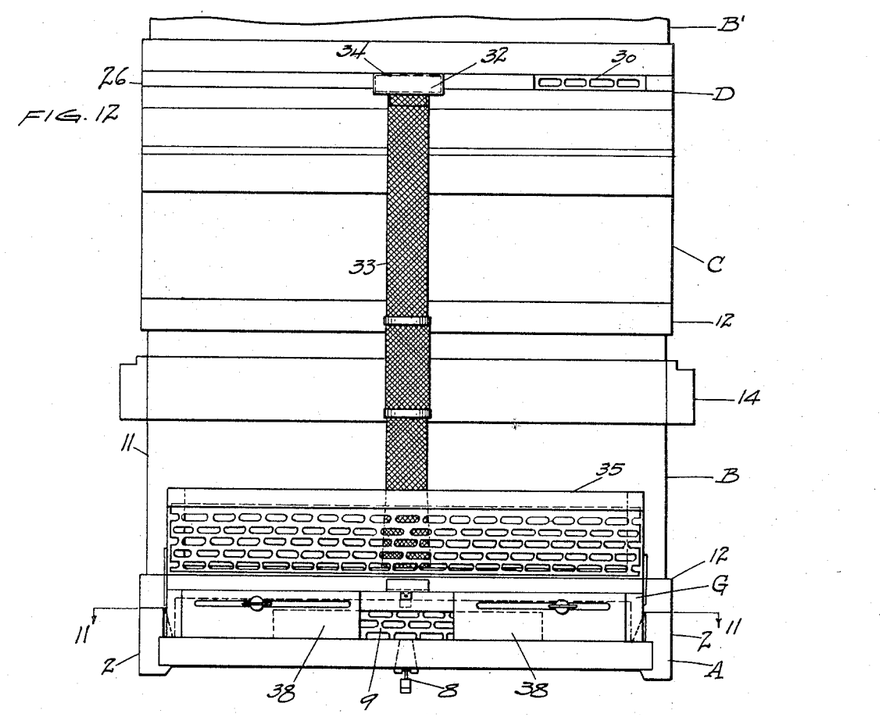
Fig. 12 is a front elevation.
Figure 13:
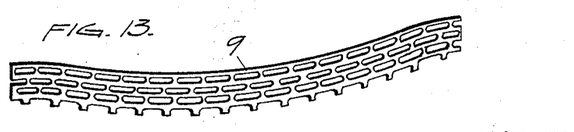
Fig. 13 is a perspective view of the perforated plate for the entrance-box.
Figure 14:
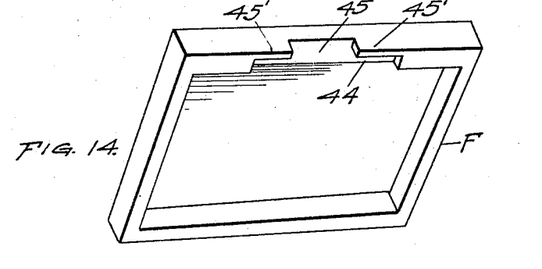
Figs. 14 and 15 are perspective views of the cap and cover, respectively.

*The drone trap.*—This device comprises a rectangular case 35 having perforated walls and a centrally-placed outlet cone 36 which registers with the slide-controlled opening 37 in the top of the entrance-box when placed thereover as shown and described in my Letters-Patent hereinbefore identified. Removal of the top wall or plate of this case permits tube 33 to be placed over the wire-mesh outlet cone 36, and the queen-bee and drones pass upward through this tube when swarming, their exit out of the front of the entrance-box C being barred by reason of the plate 9 having perforations of a size which allow only workers to pass through. In the present invention, plate 9 is curved to bring its middle portion closely adjacent to the meeting ends of the two slides or shutters 38 but sufficiently retired therefrom, see Figs. 11 to 12, to afford a passage for the workers behind the slides or shutters. In swarming, the outwardly-bound queen and drones naturally take a direct course for the narrowed central light-opening but cannot escape as they are larger than the perforations in the plate and they clog the exits at this central point but not at either side where the shutters shield and darken the box. The light being directly underneath the cone 36 the queen is quick to find this exit and will pass upward with the drones before the swarming bees return. If the entrance was not shielded and arranged in this manner the queen-bee might be delayed in reaching the tube and upper brood-box B' and the returning swarm would force the queen-bee back into the lower brood-box B.

The ends of plate 9 are removably seated in the vertical grooves 39 in the ends of the entrance-box G, the plate being curved to this extent, but the said plate might be straight or of other shape and secured in any other simple way, providing that it is slightly separated from the slides to permit the workers to pass in or out of the box G at either side of the middle or more direct passages when these become clogged.

*The upper brood-box.*—This second brood-box B' is a duplicate of the other and is placed on the surplus-box C with the bee-escape board and the swarming tube 33 when the conditions in the old hive indicate that the bees are about ready to swarm. When the bees swarm the queen usually goes with the swarm, but with my improved arrangement the queen is trapped with the drones and directed to the new hive above, and the swarming bees will return of their own accord to their queen in the new brood-chamber by way of the lower brood-box and the opening 27 in the bee-escape board, and they then form a new colony in the brood-box B'. The bee-keeper can then move the old brood-box to a new location or both brood-boxes can be left on the same stand by removing the queen-cells in the lower brood-box.

Figure 1:
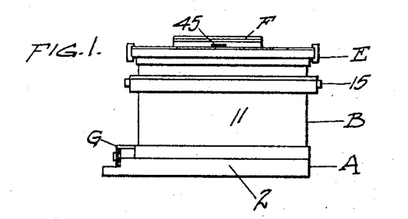
Fig. 1 shows the hive sections assembled for brooding and summer use before the super-box is required.
Figure 2:
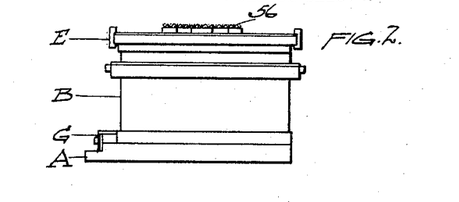
Fig. 2 shows the same sections, except that a screen takes the place of the cap on the cover, a relationship of parts used in introducing a new queen to the colony.
Figure 3:
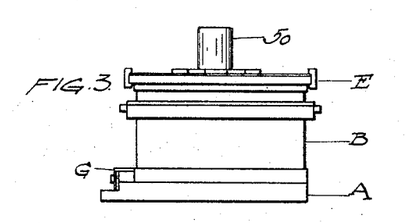
Fig. 3 shows the hive prepared with a feed-bottle as in the brooding season when feeding a weak colony.
Figure 4:
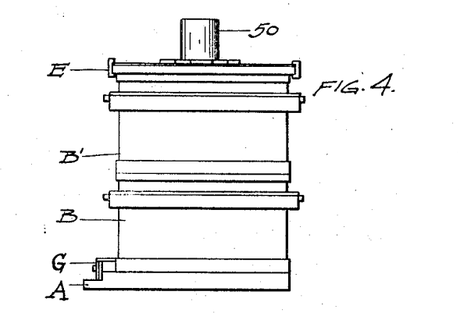
Fig. 4 shows two brood-boxes mounted one upon the other with a feed-bottle in the cover; a setting used in uniting two weak colonies when feeding is required.
Figure 5:
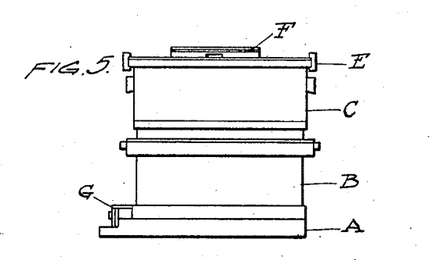
Fig. 5 shows the hive sections assembled for storing surplus honey, one surplus-box being shown.
Figure 6:
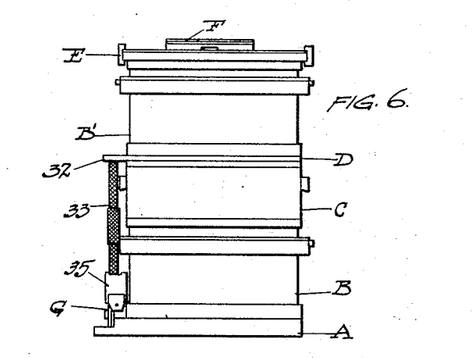
Fig. 6 shows the hive prepared for swarming bees.
Figure 7:
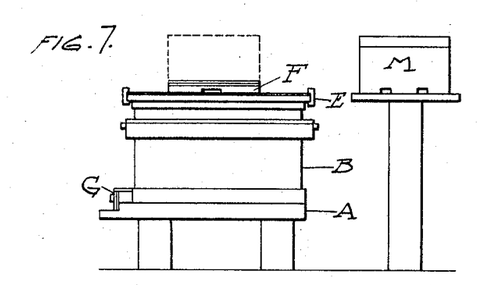
Fig. 7 shows a miniature hive or queen-mating box and my improved hive conveniently related thereto for queen-mating purposes.
Figure 8:
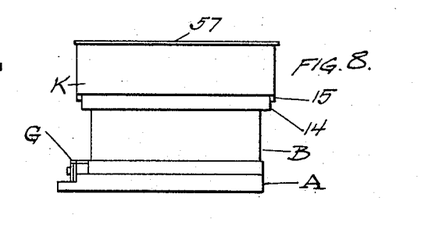
Fig. 8 shows the hive prepared for wintering the bees.
Figure 15:
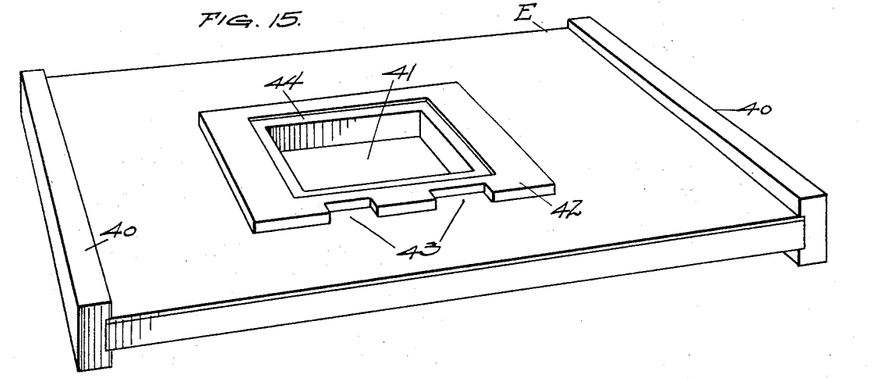
Figure 16:
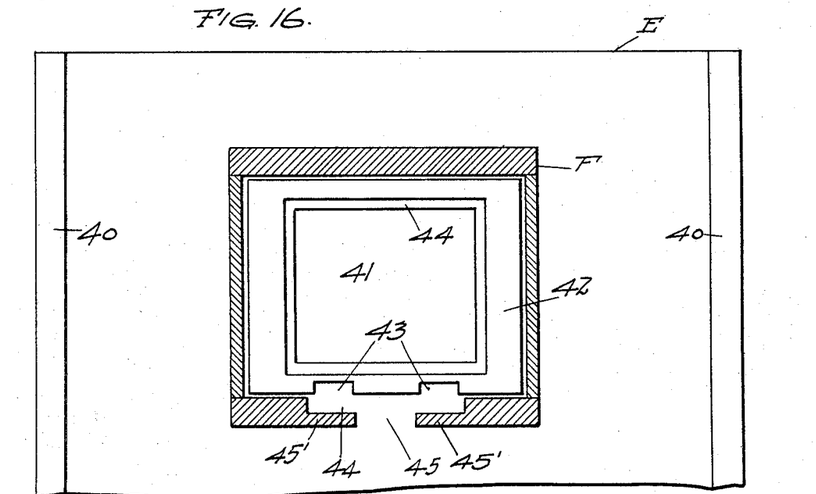
Fig. 16 is a plan and sectional view of the cover and cap together.
Figure 17:
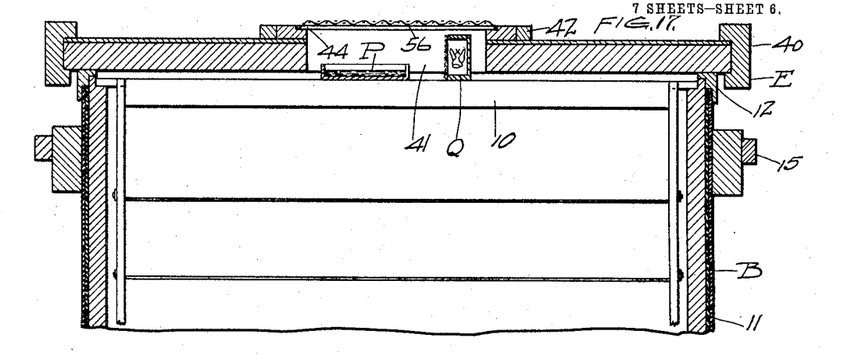
Fig. 17 is a sectional view of a portion of a brood-box as arranged when mating or introducing a new queen to the hive.
Figure 18:
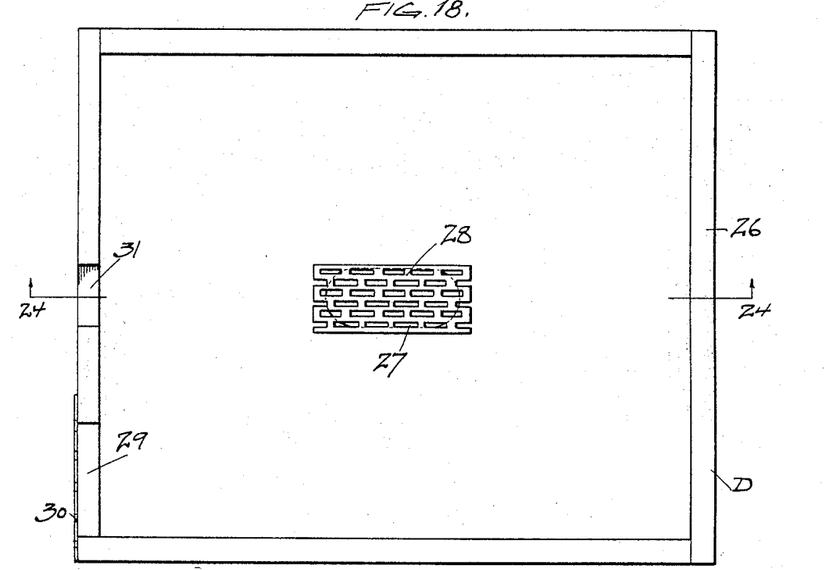
Fig. 18 is a plan view and Fig. 19 a cross section on line 24—24 thereof of the bee-escape board.
Figure 19:
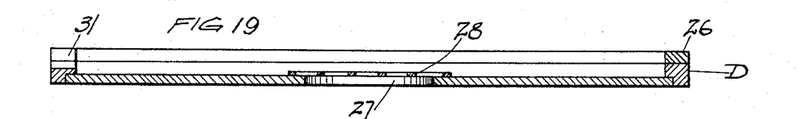
Figure 20:
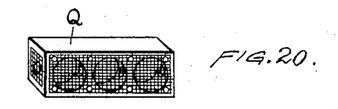
Fig. 20 is a perspective view of a queen-cage used in shipping and mating new queen-bees.
Figure 21:
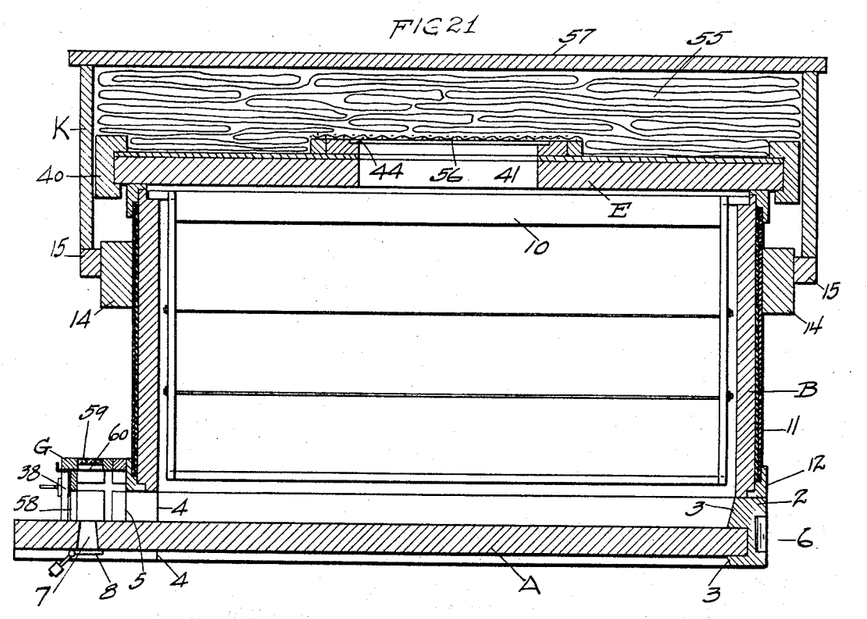
Fig. 21 is a sectional view of my improved brood-box, cover and winter-cage.

*The ventilating cover and cap.*—An essential feature of this invention resides in the cover E, Fig. 15, which resembles the ordinary cover in shape and size and in that it is provided with two side cleats 40 and is adapted to rest in slidable position on any one of the sections of the bee-hive. The improvement comprises a central opening 41 in the cover bordered by a raised molding 42 having two notches 43 in one outer side edge and a recessed seat 44 at its inner edges. The cap F fits loosely but closely about molding 42 and rests upon the top of the cover in spaced relation with the top of the molding so that the bees may travel between the parts to and from the notched passage-ways 43. When the cap F is set as shown in Fig. 16 the notches 43 are open to a channel 44 having a central door 45 in the bottom edge of the cap, but the roof of the channel is below the top plane of the molding 42, which with the projecting lips 45' on the cap at either side of the door, protect the interior from the direct rays of light and the weather. The indirect passage thus provided also serves for ventilation as well as an entrance and exit for the bees, but if the bees are to be shut in and the cap merely used for ventilation, a screen 49 is placed within or over the opening 40 in the cover E preferably in the relations shown in Figs. 9 and 10. A cover having a relatively small opening is also of advantage in that a new queen can be introduced to a colony without removing the cover and breaking the sealed joints. This is illustrated in Fig. 17 wherein the cap is shown as removed and a queen cage Q is seated upon the top bar of frame 10 within opening 41, a small feed pan P being also shown as resting on this frame. When cap F is removed a queen-mating box M can be placed on the cover over opening 41 to unite small colonies to the regular colony located at one side thereof after the queen-breeding season has passed, see Fig. 7, and in raising young bees, the colony can be fed with a bottle 50, see Figs. 3 and 4.

*The winter case.*—In extremely cold climates when it is desirable to winter the bees on their summer stands or in exposed quarters, a winter-case K is provided which consists of a wooden frame of a size to slip over the cover D into rest position upon the cleats 15 of the brood-box C. An absorbent material 55, such as coarse cloth is placed on top of cover D after the cap F is removed, and a protecting screen covers opening 41 to support the cloth and also to confine the bees when this cloth is removed and changed. The feed-cup 46 and screen-ring 49 may be used in lieu of screen 56. Finally, a loose board 57 is placed over all. The filling 55 takes up the moisture arising from the interior of the hive and can be changed when it becomes sour or moldy without removing the cover D and breaking sealed joints nor will the colony be disturbed or endangered. Healthy conditions can thus be maintained and weak or diseased colonies can be taken care of and by using the entrance box in connection with this cover and winter-case the colony can easily protect themselves against other more stronger robbing colonies who in turn would carry disease to their own hives if such protection was not afforded.

Figure 23:
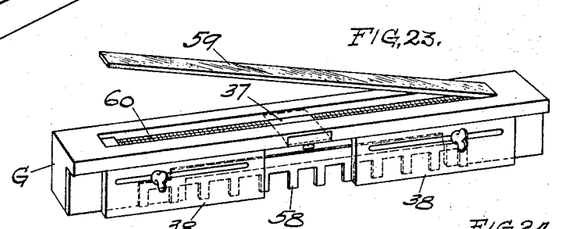
Fig. 23 is a perspective view of the entrance-box arranged for winter use.
Figure 24:
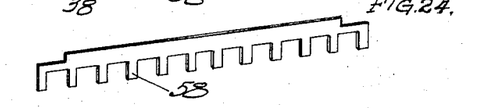
Fig. 24 is a perspective view of the rodent guard-plate removed from said box.

*The rodent guard.*—In wintering the bees, the entrance-box G, see Fig. 23, is equipped with a comb or equivalent plate 58 clamped behind the slides or shutters 38 to prevent mice or other rodents from entering the hive and committing damage and theft. The openings in this comb or plate are too small for such animals but are large enough for both the drones and workers. The conditions at this time also call for more light at the entrance-box but less draft or intake of cold air, and for this reason, a strip 59 of glass or other transparent material is laid within the elongated openings 60 in the top of the entrance box G.

What I claim is:

1. A bee-hive having a front entrance and a bottom-board having a beveled border-frame projecting from its top and bottom to different heights and provided with stop-shoulders at said front entrance in both beveled portions thereof.

2. A bee-hive having a bottom-board and a front entrance thereat and provided with a vertical trap-opening in said bottom-board outside of said entrance in combination with a guarded entrance box at the front of said entrance and above said trap-opening.

3. In a bee-hive, a bottom-board having a vertical discharge opening at its front end provided with a horizontally-disposed self-closing trap-door adapted to discharge matter deposited thereon.

4. In a bee-hive, a pair of boxes, in combination with a bee-escape board having openings in its bottom for the working bees only, and a separate side entrance for the queen-bee and drones said board being a removable intermediate member for said boxes.

5. In a bee-hive, a bee-escape board adapted to be used as an intermediate member between two boxes, having a bottom opening provided with a perforated guard-plate for the passage of the smaller bees only and a side-opening provided with a perforated guard-plate and a recessed border to seat an entrance device.

6. In a bee-hive, a brood-box having a narrowed central entrance and exit for the bees and direct and indirect passages leading thereto, the indirect passages being shielded from the light, in combination with a second superposed brood-box and a bee-transfer device open thereto and to the said direct passages at said entrance and exit.

7. In a bee-hive, a brood-box having a narrowed entrance and exit opening and a perforated guard inwardly retired therefrom to provide indirect light-shielded passageways for the bees at both sides, of said opening.

8. In a bee-hive, a brood-box having an entrance provided with shutters and a perforated guard spaced apart therefrom to provide lateral shaded passages for the bees behind the shutters and in front of the guard.

9. In a bee-hive, an entrance box having adjustable shutters and a perforated plate removably secured therein in spaced relation behind said shutters to provide lateral passageways in front of the guard, whereby the working bees may pass in or out when the direct passage-ways are clogged by other bees.

10. In a bee-hive, a brood-box having a guarded entrance, a bottom-board having a larvæ discharge-opening inside of said guarded entrance opposite, and a swarming tube directly above said discharge-opening.

11. In a bee-hive, a brood-box having an entrance for said brood-box and shutters to decrease or enlarge said entrance, in combination with a bottom-board having larvæ discharge opening centrally located in respect to said entrance, and a guard-plate interposed between said opening and said shutters to prevent the escape of the larger bees of the colony.

12. In a bee-hive, a hive section having an open entrance at its bottom, a cover having an opening co-acting with the entrance to ventilate the hive, and means to shade said opening from the light.

13. In a bee-hive, a hive section having an entrance provided with means to open and close the same to a greater or less degree, in combination with a cover having a ventilating opening and means to guard the same against admission of light to the hive.

14. In a bee-hive, a brood-box having an entrance and a pair of shutters to widen or narrow said entrance, in combination with a comb-plate fixed across said entrance to prevent rodents from entering the brood-box and having openings therein large enough for the free passage of all the bees in the colony.

15. In a bee-hive, a brood-box having an entrance and an adjustable door to regulate the admission of air, and an air-excluding window of transparent material opposite said entrance.

In testimony whereof I affix my signature in presence of two witnesses.

GEORGE C. RAHN.

Witnesses:
E. M. FISHER,
R. B. MOSER.